March 1, 1966 R. G. GREENAWALT 3,237,771
WATER-SENSITIVE FILTER AND FLOW MONITOR
Filed Sept. 6, 1963
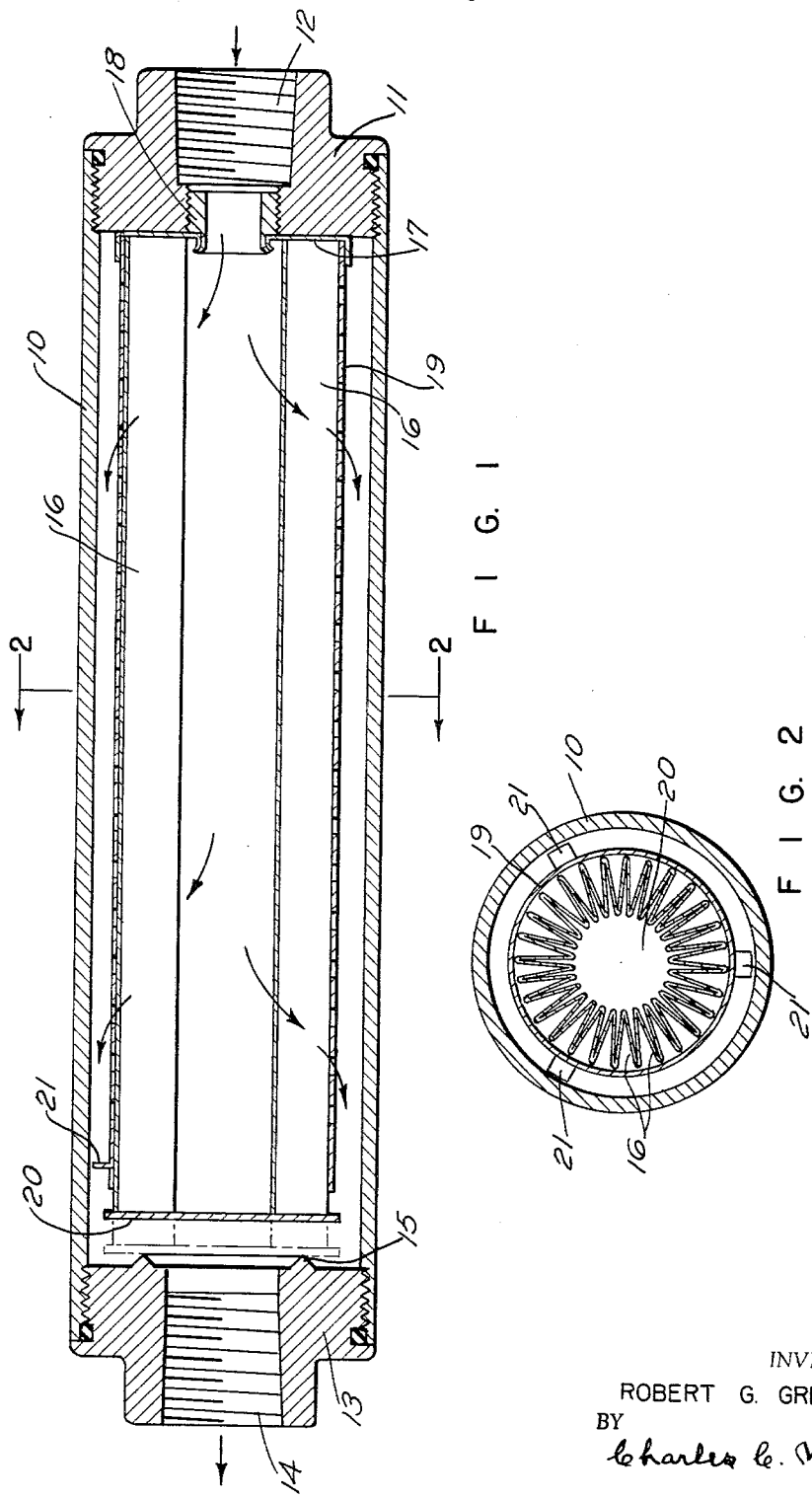
INVENTOR.
ROBERT G. GREENAWALT
BY
Charles C. Willson
ATTORNEY

United States Patent Office 3,237,771
Patented Mar. 1, 1966

3,237,771
WATER-SENSITIVE FILTER AND
FLOW MONITOR
Robert G. Greenawalt, Barrington, R.I., assignor to Fram Corporation, Providence, R.I., a corporation of Rhode Island
Filed Sept. 6, 1963, Ser. No. 307,072
2 Claims. (Cl. 210—96)

This invention relates to a fluid filter, and more particularly to such a filter that serves as a water-sensitive flow monitor to stop or retard the flow of the fluid if it carries an appreciable quantity of water.

The filter and water monitor of the present invention may be used in various fields where it is desired to stop or retard the delivery of a liquid or other fluid if it carries an appreciable amount of water.

One field of use of the filter and monitor of the present invention is upon fuel dispensing pumps at the service stations for motor vehicles. Another field of use is at the downstream side of a liquid separator employed to remove water and contaminants from fuel being delivered to aircraft. Another use is in the industrial field where it may be desired to make sure that oil or other liquid being delivered to a point of use is free of an appreciable quantity of water. Still another field of use is in compressed air or compressed gas systems where it is desired to deliver such air or gas relatively free of moisture.

The preferred embodiment of the present invention comprises a cylinder-shaped filter element formed of water-sensitive pleated paper having the pleats extending in an axial direction. Such element is mounted in a filter housing having an inlet at one end and an outlet at the other end and is supported therein to expand lengthwise in said housing.

It is important that the paper used in such filter element or cartridge be water sensitive and will expand in the lengthwise direction of the pleats as the paper absorbs water. It is also important that this cartridge be anchored at one end and that its other end be free to move in the axial direction as the paper expands, to thereby increase the length of the filter element.

In the prefered embodiment of the invention just referred to one end of the filter element or cartridge is anchored to the inlet portion of the filter housing, and a closure valve is attached to the other freely moving end of the cartridge. This valve is disposed near a valve seat so that when the pleated paper cartridge absorbs water and expands lengthwise it will move the valve into engagement with the valve seat to stop the flow of the liquid or other fluid out of the filter housing.

The filter and water monitor of the present invention may be variously constructed but the important features of the present invention reside in a pleated paper filter element that expands lengthwise upon absorbing water and in means for employing this lengthwise movement to close a fluid outlet valve.

The above and other features of the present invention will be further understood from the following description when read in connection with the accompanying drawing, wherein:

FIG. 1 is a longitudinal sectional view through the water-sensitive filter and flow monitor of the present invention; and FIG. 2 is a section taken on the line 2—2 of FIG. 1.

In the embodiment of the invention shown in the drawing, the filter element and flow monitor to be described are mounted in a housing conveniently formed of a pipe or tube 10 internally threaded at each end. One end of such tube is closed by the threaded plug 11 having the internally threaded hole 12 adapted to receive a fluid supply pipe, not shown. A ring gasket is provided adjacent the end of the tube 10 to form a tight seal within the plug 11.

The other end of the tube 10 is closed by a similar plug 13 having the internally threaded hole 14 adapted to receive the end of an outlet pipe, not shown. A ring gasket is provided at this end of the tube 10 to form a tight seal within the plug 13. At the inner end of the plug 13 is formed a valve seat 15.

The filter shell or housing just described has removably mounted therein a water-sensitive filter element or cartridge which will now be described, and which serves to stop the flow of a liquid or other fluid through the housing if such fluid carries an appreciable amount of water.

Such filter element or cartridge is cylindrical in shape and is formed of pleated paper having the pleats 16 extending longitudinally of the cylinder. The upper end of the pleated paper element 16 is closed by the metal end cap 17 that is secured to the ends of the pleats by a suitable bonding agent such as plastisol. The cap 17 has a central opening and is provided with the externally threaded metal tube 18 the lower end of which is swaged or otherwise secured to the cap 17.

The paper pleats 16 preferably are protected by the perforated outer jacket 19 the upper end of which is soldered or otherwise secured to a downwardly extending outer rim of the cap 17. The jacket 19 is preferably somewhat shorter than the pleats 16 as shown in FIG. 1. To the lower end of these pleats is bonded the end cap or disc 20 that has no central hole, so that it completely closes this end of the cartridge. This disc 20 is preferably formed of hard stiff paper and it is adapted to engage the valve seat 15 and stop the flow of fluid out of the filter housing, if the cartridge absorbs enough water to cause it to expand appreciably.

The water-sensitive filter cartridge just described is supported in a suspended condition in the housing 10 by the threaded tube 18 which is screwed into a threaded portion of the plug 11. The arrangement is such that the lower end disc 20 of the cartridge is normally held in spaced relation to the valve seat 15 as shown in full lines in FIG. 1. If the paper forming the pleats 16 absorbs an appreciable amount of water, it will expand lengthwise to move the end disc 20, which also serves as a valve, into engagement with the valve seat 15 as shown in dotted lines in FIG. 1. The perforated outer tube 19 preferably has the outwardly bent tabs 21 near its lower end where they help to center the cartridge in the housing 10.

The paper used in forming the pleated filter element 16 may be similar to that used heretofore and it may be treated with phenol resin as heretofore or it may be resin free. The amount of resin in the paper will to a degree determine the rate at which the paper will absorb water. In either case, it should be water sensitive so that it will absorb water in the fluid that is being filtered, and will expand in the direction of the pleats as the paper picks up water. When this happens the expanding pleats 16 will move the end disc 20 downwardly to engage the valve seat 15 as shown in dotted lines in FIG. 1.

One type of paper that was found to perform satisfactorily when used as herein contemplated had a basic weight when dry of 204 pounds per 3000 square feet and was 36 mils thick. This paper was 100 percent cellulose and contained no resin. It had a maximum pore size of 6.4 inches of water pressure. Its lengthwise dry stiffness (Gurley) was 5000 mg. and its crosswise dry stiffness (Gurley) was 2500 mg. A strip of this paper 1 inch wide and 4 inches long expanded to 4¼ inches at the end of two minutes when immersed in water. The paper was maintained under slight tension throughout the test.

The flow through the housing and cartridge preferably is as indicated by the arrows; that is, the fluid enters at the upper end of the filter housing and flows into the center passage of the filter cartridge to pass outwardly through the pleats 16 as indicated by the arrows. Upon reaching the exterior of the cartridge and perforated outer tube 19 it flows downwardly toward the lower inlet passage 14. As long as the liquid, or other fluid, is approximately free of moisture the end disc 20, which serves as a closure valve, will remain in the raised position in which it is shown in full lines in FIG. 1. If, however, the paper pleats absorb an appreciable amount of water, they will expand lengthwise and move the disc 20 to or near the closed dotted position of FIG. 1. It will be noted that the downward flow of the fluid will act upon the disc 20 as the latter approaches its seat 15 to help the pleats to close the valve 20. If desired the flow could be outside-in through the cartridge and in this case a perforated center tube should be provided to support the inner knuckles of the pleat folds. However, the inside-out flow illustrated in the drawing is preferred.

Other means than the threaded tube 18 may be employed to support the filter cartridge in its operating position in the filter housing, but this threaded means is desired because the distance the end disc 20 is normally supported from the valve seat 15 can be readily varied by placing one or more spacing rings between the upper face of the cap 17 and lower face of the plug 11.

When the filter cartridge is to be changed the upper threaded plug 11 is unscrewed from the housing tube 10 and this plug and the filter cartridge will be removed as a unit.

The paper used to form the pleated element 16 may have either coarse or fine pores as desired, depending upon the liquid or gas to pass therethrough in the inside-out direction. The important feature is that the paper be water sensitive so that it will expand and close the valve 20 if the fluid being filtered carries an appreciable amount of water.

It will be seen from the foregoing that the water-sensitive filter and flow monitor of the present invention is simple in construction and inexpensive to manufacture, and it may be relied upon to retard or stop the flow of a fluid if it carries an appreciable amount of water. If it retards the flow this will serve to warn the attendant that the fuel contains water; but if it stops the flow of the fluid, wet fluid will not reach the point of use.

Having thus described my invention, what I claim and desire to protect by Letters Patent is:

1. A water-sensitive filter and flow monitor, comprising a filter housing having a fluid inlet at one end and a fluid outlet at the other end, a valve seat near said outlet, an annular pleated paper filter element having the pleats extending axially and formed of water-sensitive paper that will expand in the direction in which the pleats extend when the paper absorbs water, means for anchoring one end of the filter element to the inlet portion of the housing so that the other end of the element is free to move, and a valve attached to the free end of said element and positioned to be moved into fluid-closing engagement with said seat when the pleats absorb water and expand lengthwise.

2. A water-sensitive filter and flow monitor, comprising a filter housing having a liquid inlet at one end and a liquid outlet at the other end, a valve seat near said outlet, an annular pleated paper filter element of the inside-out flow type and having the pleats extending axially and formed of a water-sensitive paper that will expand in the direction in which the pleats extend when the paper absorbs water, means for anchoring one end of the filter element to the inlet portion of the housing so that the other end of the element is free to move, and a valve attached to the free end of said element and positioned to be moved into liquid closing engagement with said seat when the pleats absorb water and expand lengthwise.

References Cited by the Examiner
UNITED STATES PATENTS

| | | |
|---|---|---|
| 2,757,802 | 8/1956 | Robinson et al. |
| 2,842,152 | 7/1958 | Winter et al. |
| 3,034,656 | 5/1962 | Kasten. |

REUBEN FRIEDMAN, *Primary Examiner.*

D. M. RIESS, *Assistant Examiner.*